United States Patent [19]

Hara et al.

[11] Patent Number: 5,007,822
[45] Date of Patent: Apr. 16, 1991

[54] INJECTION MOLDING MACHINE

[75] Inventors: Hitoshi Hara, Funabashi; Katsutoshi Inoue, Chiba, both of Japan

[73] Assignee: Sumitomo Heavy Industries, Ltd., Tokyo, Japan

[21] Appl. No.: 362,461

[22] PCT Filed: Aug. 29, 1988

[86] PCT No.: PCT/JP88/00859
§ 371 Date: Apr. 19, 1989
§ 102(e) Date: Apr. 19, 1989

[87] PCT Pub. No.: WO89/01860
PCT Pub. Date: Mar. 9, 1989

[30] Foreign Application Priority Data

Aug. 28, 1987 [JP] Japan .................. 62-212929

[51] Int. Cl.$^5$ .............................. B29C 45/04
[52] U.S. Cl. ..................... 425/575; 425/588
[58] Field of Search ............. 425/575, 574, 588, 542

[56] References Cited

U.S. PATENT DOCUMENTS 3,914,081 10/1975 Aoki ........................ 425/574 X
3,982,869 9/1976 Eggers ...................... 425/575
4,144,010 3/1979 Fenner ...................... 425/574 X
4,205,950 6/1980 Suss et al. .................. 425/575 X

FOREIGN PATENT DOCUMENTS 60-6216 2/1985 Japan .
60-61222 4/1985 Japan .
61-29515 2/1986 Japan .
62-53125 4/1987 Japan .
62-152825 7/1987 Japan .

Primary Examiner—Richard L. Chiesa
Attorney, Agent, or Firm—Armstrong, Nikaido, Marmelstein, Kubovcik & Murray

[57] ABSTRACT

As injection molding machine in which a plurality of stationary molds (29) are securely disposed in a row on a stationary platen (3) and transversely extending parallel to one another, and a moving mold (6) to be coupled with the stationary molds is supported as a unit displaceable in a lateral direction in a mold holder with regard to a moving platen (4), by coupling and clamping the moving mold (6) and one of a plurality of stationary molds (29) together, injection molding is accomplished, thus by changing stationary molds one after another and clamping the moving mold, the injection molding is accomplished to obtain multi-colored or multi-material molded products. The moving mold protrudes a small distance beyond the end surface of the mold holder facing the stationary mold to minimize flash produced by slanting due to off-center pressure on the molds.

4 Claims, 5 Drawing Sheets

INJECTION MOLDING MACHINE

TECHNICAL FIELD

The present invention relates to an injection molding machine, and more particularly to an injection molding machine having multiple functions for molding products manufactured from multiple colors or multiple materials.

BACKGROUND OF THE INVENTION

Conventionally, an injection molding machine for molding products made from multiple colors or multiple materials is well known of a type that a turn table is mounted on a moving platen and several moving molds are attached to this turn table as well as the same number of stationary molds are attached to the stationary platen, so that along with the rotation of the turn table, different configurations of cavities are formed one after another by each different combination of the stationary mold and the moving mold, and resin of different colors and materials is successively injected into those cavities. Typical examples of those well known injection molding machines have been disclosed in Japanese Patent Application Laid-Open No. 61-29515 and Japanese Utility Model Application Laid-Open No. 62-53125.

In those conventional injection molding machines, however, positioning of the moving mold and the stationary mold is difficult unless the precision of the rotation and the positioning of the driving mechanism which drives the moving mold is improved. In addition, it is difficult to obtain the products of high reliability when taking aged deterioration into consideration.

And, in the field of molding multiple colors or materials, the general trend is directed toward producing a small quantity of various kinds of goods. In this case, decreasing the expenditure for molds becomes a problem, because the conventional machine is so complicated in its structure and also requires various kinds of high-priced molds, resulting in too much expense for the molds.

Further, the conventional multiple colors or materials molding machine is specialized for multiple colors or materials molding, not for usual one color or material molding. Accordingly, there arises another problem that the adaptability and availability of the molding machine will be deteriorated.

Furthermore, such an injection molding machine is well-known that uses one moving mold in order to decrease the number of molds, as is disclosed in Japanese Patent Application Laid-Open No. 62-152825, a plurality of stationary molds are moved up and down with respect to this one moving mold to establish multiple colors or materials molding. In such a molding machine, however, it is necessary to detach an injection nozzle, which has been inserted into the stationary mold, from the stationary mold by retreating it away from the mold at each time of switching over the stationary mold, thereby causing a prolonged molding cycle; and also there is another defect in that, in case of using an injection nozzle, the resin dripped from the distal end of the nozzle during retraction of the nozzle will be caught between the injection hole of the stationary mold and the nozzle end, so that a gap is defined between the nozzle and the stationary mold. The gap causes the leakage of resin that leads to a break in molding. Although there is such measure to prevent the dripping of resin, as providing a needle valve at the distal end of the nozzle, it presents another problem in that due to the presence of operation mechanism of the needle valve, resin is often stored within the nozzle, which results in the deformity of molding such as burn marks.

One object of the present invention is to provide an injection molding machine for manufacturing products from multiple colors or materials which has a structure so simple as to enable the precise positioning between the moving mold and the stationary mold, as well as the reduction of the expense for the molds.

Another object of the present invention is to provide an injection molding machine for making products of multiple colors or materials which assures the shortening of the molding cycle and also eliminates problems such as the leakage of resin and the like.

Still another object of the present invention is to provide a multiple-functioned injection molding machine which can be used not only for molding products of multiple colors or materials but for molding one color or one material products and also can change colors and resin effectively, as well as it can be applied for multiple-type molding.

DISCLOSURE OF THE INVENTION

According to the present invention, there is provided an injection molding machine comprising: a plurality of stationary molds which are securely disposed in a row on a stationary platen and transversely arranged parallel to one another; a moving mold which forms at least one mold cavity when coupled with each said stationary mold; a mold holder formed with a passage for allowing the moving mold to be linearly slidable in a direction parallel to the stationary molds, said mold holder being mounted on a moving platen; a plurality of injection units provided so as to be apposed to or displaced away from the stationary molds respectively; and transfer means which convey the moving mold along the passage in the mold holder to a position in apposition to one of the stationary molds.

Thanks to the above structure of the present invention, the respective molds are compatible with one another and enables the reduction of the number of molds as well as the simplification of the mold structure, thereby resulting in less expenses for the molds. Besides, as it can easily cope with products which have no clear outlook for lot production at an early development stage, molds can be easily supplied so that the development period can be minimized.

In an injection molding machine according to the present invention, when it is used for several colored products, molding is done by using one injection unit, whereas another injection unit is cleaned and changed resin while waiting for the next injection molding. Therefore, it is not necessary to stop the whole molding machine, so that the productivity can be greatly improved.

Further, in an injection molding machine according to the present invention, the injection movement of a plurality of injection units is carried out one by one, not altogether, which allows a hydraulic pressure unit to be smaller in size, thus saving space.

In case of one color or one material injection molding, the same number of moving molds as stationary molds are mounted on the mold holder in order to carry out the clamping of a plurality of molds at the same time, then, the resin will be injected for molding into each mold successively. In this case, heating cylinders of each injection unit waiting in line can be preheated so as to eliminate waiting time for heating, resulting in higher availability.

In the actual application of the above-mentioned structure of the present invention, when the end surface of the moving mold in abutting relation to the stationary mold is set on the same plane with the end-surface of the mold holder, the total contact area with the stationary mold at the time of clamping becomes as large as the sum of the area of the end surface of the moving mold and that of the mold holder, which makes the pressure of the contact surfaces smaller to the pre-determined clamping force. Accordingly, the pressure of resin in the cavity of the mold produces a small space between the contact surfaces of the moving mold and the stationary mold, leading to a great possibility of occurrence of a flash. In order to solve the problem, according to the preferred embodiment of the present invention, the end surface of the moving mold is so arranged that it is slightly protruding from the end surface of the mold holder.

By such an arrangement, the contact area at the time of clamping turns out to be only the area of the end surface of the moving mold, resulting in larger pressure on the contact surfaces. In this case, however, as the moving mold is dislocated from the center line of the clamping force, a slanting may occur due to the deviation load. If the balance to the stationary mold is broken over the point of allowance, a flash will be caused by the low clamping pressure of the contact surfaces. Therefore, the amount of protrusion of the moving mold should be kept under a certain limit. The result of experiments show that no flash occurs when the amount of the protrusion of the movable mold is kept under 0.05 mm.

BEST MODE FOR CARRYING OUT THE INVENTION

Figure 1:
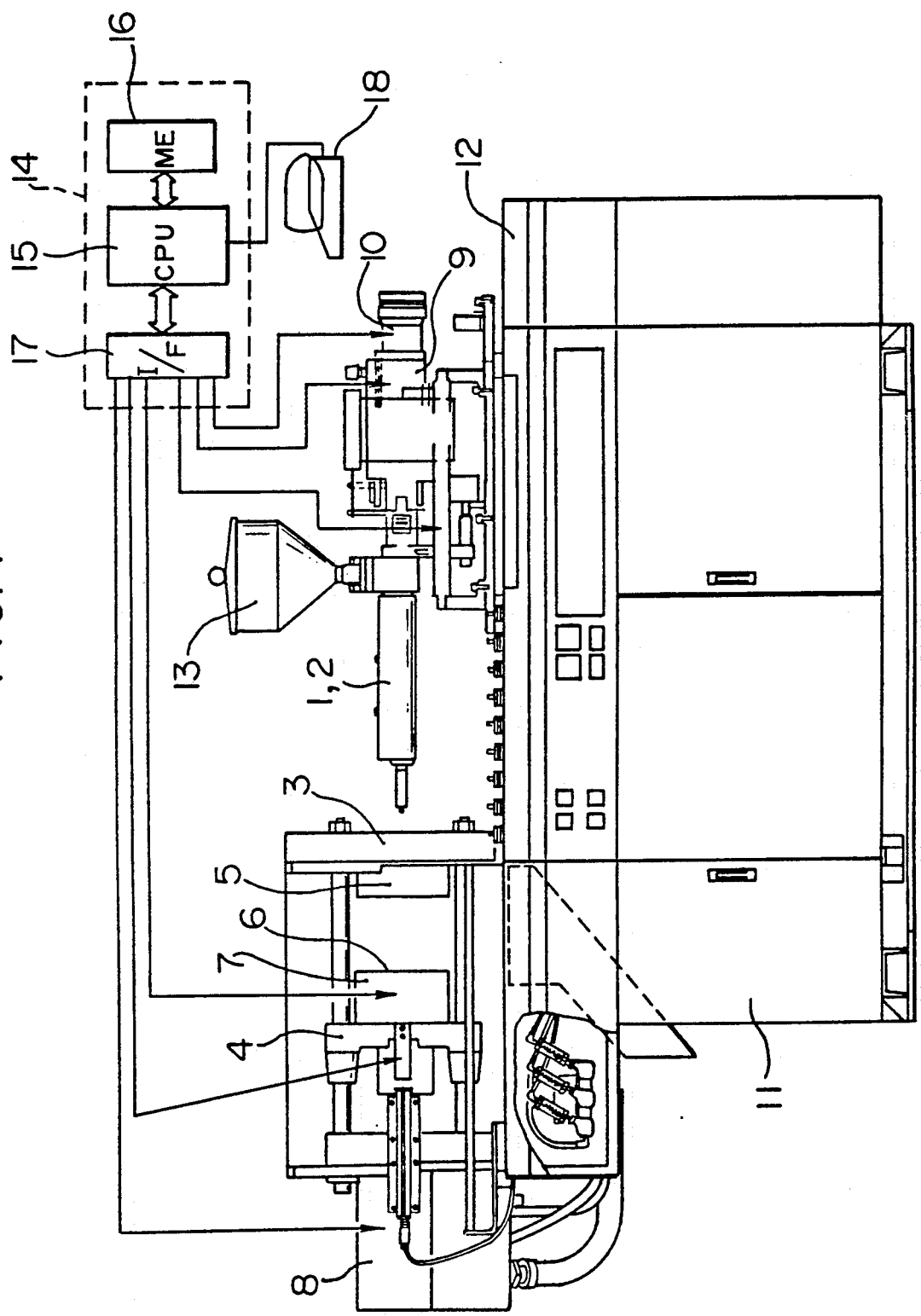
FIG. 1 is a side view showing the entire structure of one embodiment of an injection molding machine according to the present invention.
Figure 2:
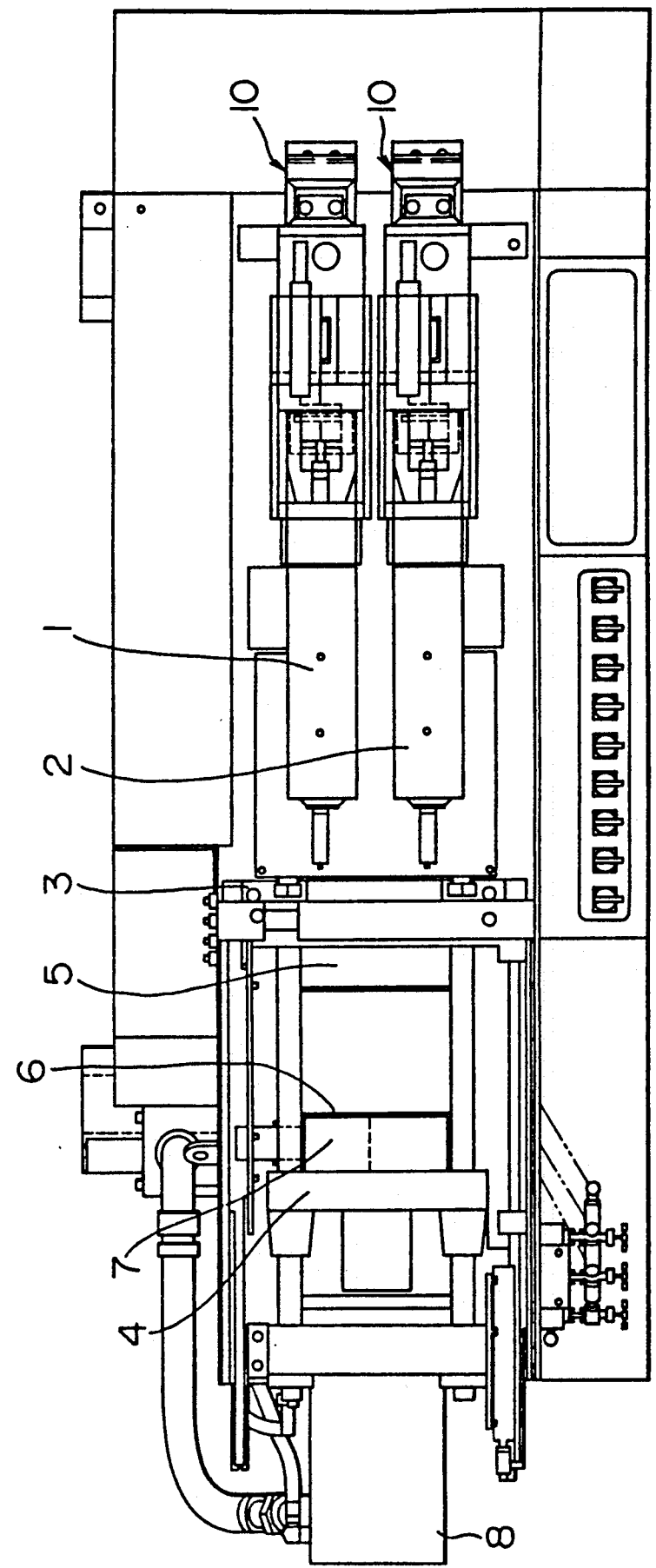
FIG. 2 is a plan view of the injection molding machine, shown in FIG. 1.

FIGS. 1 and 2 are a side view and a plane view, respectively showing the whole of one embodiment of an injection molding machine according to the present invention. In these FIGS. 1 and 2 are injection units respectively whose molding conditions can be set independently, 3 is a stationary platen, 4 is a moving platen, 5 is stationary molds forming two kinds of molding cavities, 7 is a mold holder on which one moving mold 6 forming molding cores is mounted, 8 is a driving means for opening and closing the molds, 9 is an injection controller, 10 is a screw driving means, 11 is a control panel, 12 is a base plate, 13 is a hopper, 14 is an electronic control device, 15 is a central processing unit, 16 is a memory, 17 is an interface circuit, and 18 is a data setting means.

Figure 3:
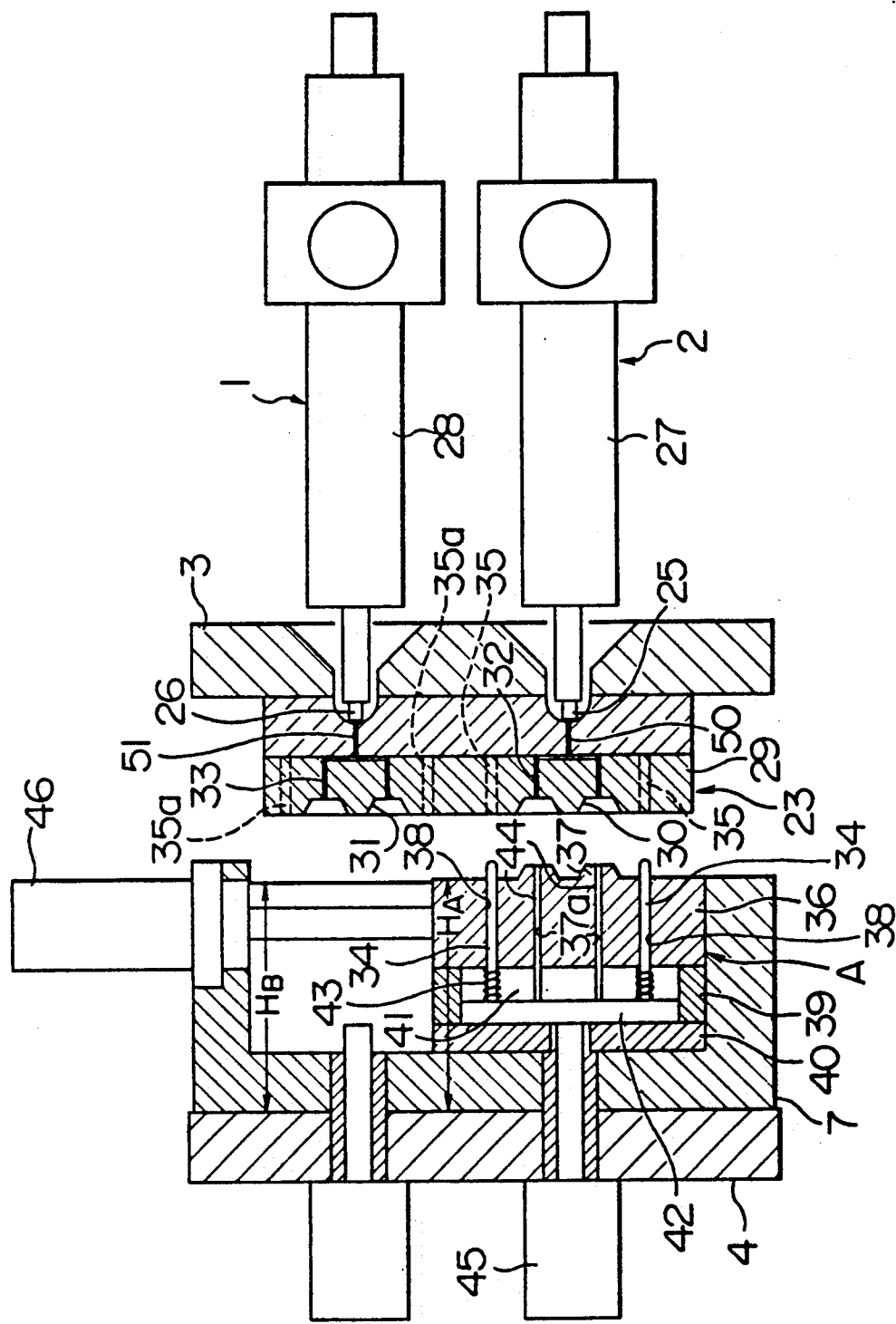
FIG. 3 is an enlarged sectional view illustrating the detail of molds and the main part of the injection molding machine, shown in FIGS. 1 and 2.

FIG. 3 is a cross-sectional plan view showing a detailed structure of the mold portion between the fixed platen 3 and the moving platen 4.

In FIG. 3, the injection apparatus 1, 2 are provided at their distal ends with nozzles 25, 26 and with heating cylinders 27, 28 which are extractable and retractable by means of nozzle touch cylinders (not shown). On the nozzles sides of such heating cylinders 27, 28, the cavity mold 29 as the fixed mold of a mold portion 23 is attached to the stationary platen 3. The cavity mold 29 is formed with two pairs of cavities 30, 31 each having a different configuration and spaced at proper intervals. Passages 32, 33 are connected to those cavities 30, 31 for melted resin injected from the nozzles 25, 26.

Two pairs of cavities 30, 31 are formed on the cavity mold 29 so that one pair of the cavities 30 are sized smaller than the sizes of the other pair of the cavities 31. Thus, after the injection molding process to one pair of the cavities 30 has been completed, the molds are opened and the core mold is moved toward the other cavities 31, so that further injection molding can be accomplished in the gaps between the outer surfaces of the products which have been molded in the cavities 30 and the inner surfaces of the cavities 31, thereby obtaining finished products having multiple materials.

Moreover, the cavity mold 29 is provided with positioning holes 35, 35, 35a, 35a to receive a plurality of positioning pins 34, 34 which will be described hereafter.

And, at a location opposite to the cavity mold 29 there is provided a core mold 36 as a moving mold which is the other part of the mold portion 23. The core mold 36 is formed with a pair of cores 37, inserting holes 38, 38 for slidably receiving the positioning pins 34, 34 and through holes 37a extending from the bottom of the core mold 36 through the core 37.

At the lower side of the core mold 36 there is provided an abutment 39 as a support for bearing the tightening force from clamping means (not shown), and a rear plate 40 is also provided on the rear end of the abutment. Further, an ejector plate 42 is movably mounted within the space 41 defined by the core mold 36, the abutment 39 and the rear plate 40.

A plurality of the positioning pins 34, 34 are attached to the ejector plate 42, these pins 34, 34 being inserted into the inserting holes 38, 38. Thus, the positioning pins 34, 34 extends through the front end of the core mold 36 toward the side of the cavity mold 29. During the molding the precise positioning between the cavity mold 29 and the core mold 36 can be accomplished by inserting the extended portions of the positioning pins 34, 34 into the positioning holes 35, 35 of the cavity mold 29.

Inserted between the core mold 36 and the ejector plate 42 are springs 43 surrounding the positioning pins 34, 34, whose spring force always pushes the ejector plate 42 toward the side of the moving platen 4, thus preventing abrupt displacement of the plate 42.

Further, ejector pins 44, 44 are attached to the ejector plate 42 extending through the through holes 37a of the core mold 36 and terminating at the core 37. The ejector pins 44, 44 can move while the ejector plate 42 is transferred. Also, ejector cylinders 45 for moving the plate 42 are mounted on the rear portion of the ejector plate 42.

Then, the core mold 36, the abutment 39, the rear plate 40 and the ejector plate 42 compose an integrated block A, which is slidingly movable in the horizontal (or vertical) direction with respect to the mold holder 7 by a moving cylinder 46.

A dovetail groove (not shown) is engraved on the mold holder 7. When the moving cylinder 46 operates, the block A slides within the guide passage along the dovetail groove.

Reference numerals 50, 51 in FIG. 3 show runners.

Also, in this embodiment, the detailed description has been given of a type which has the cavity mold 29 as a stationary mold and the core mold 36 as a moving mold. However, it is needless to say that the same effect can of course be obtained when the core mold is used as a stationary mold and the cavity mold is used as a moving mold.

Figure 4:
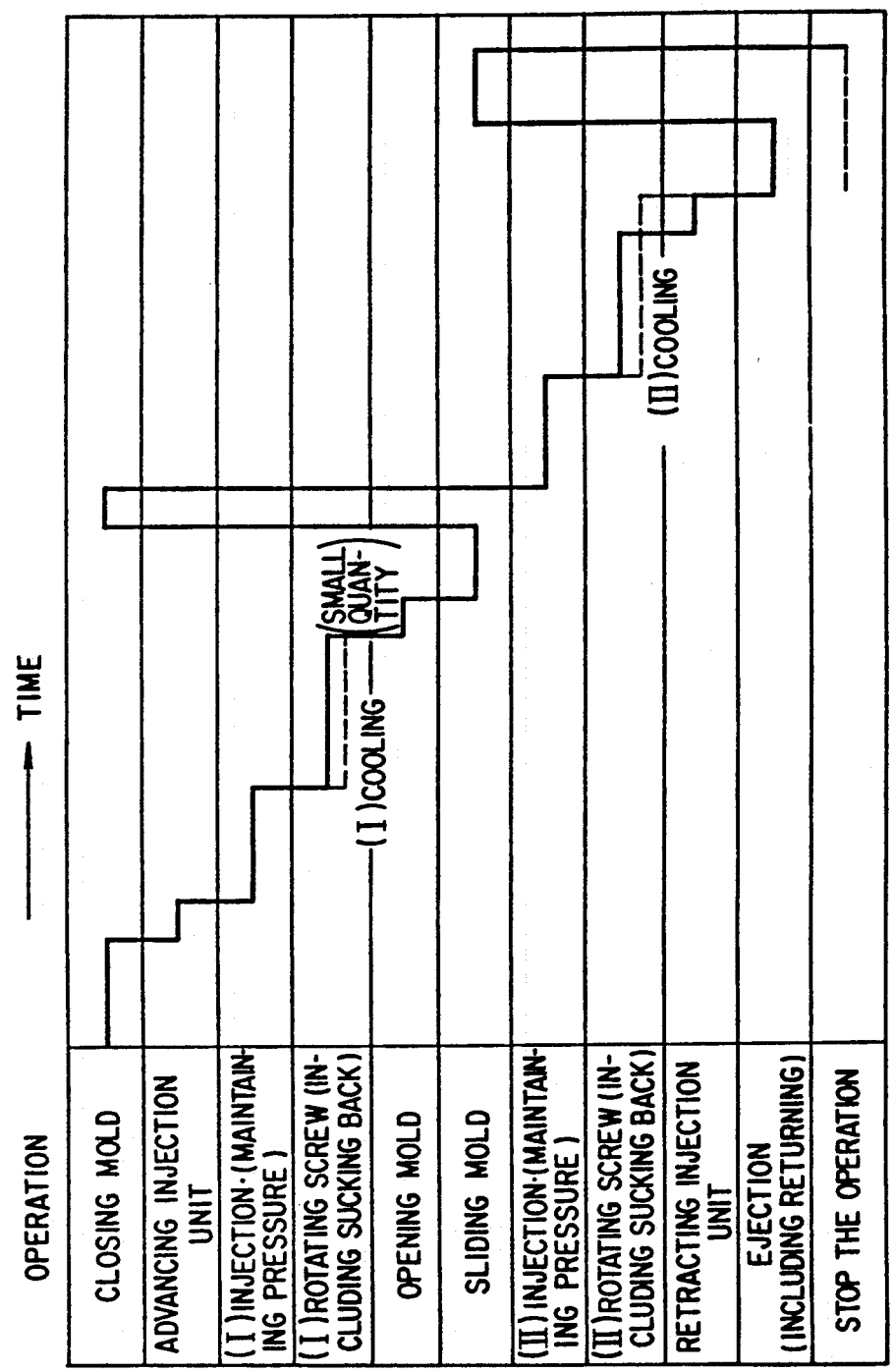
FIG. 4 is an operation control diagram utilized when the injection molding machine of the present invention is used for two colors or materials molding.

The injection molding machine of the present invention has the above-mentioned structure. In case of the two-colored or two-materials molding, it operates as is shown in an operation control diagram of FIG. 4. First, the moving mold i.e., the core mold 36 is brought by the cylinder 46 to a position opposite the stationary mold i.e., the cavity mold 29 on the side which is associated with the injection unit 2, as shown in FIG. 3. In this position, in accordance with a control signal from the electronic control device 14 (see FIG. 1), an electromagnetic directional control valve (not shown) operates the mold driving means to close the mold. At this time, the positioning between the cores 37 of the core mold 36 and the cavities 30 of the cavity mold 29 can be accomplished by having the positioning pins 34, 34 extending through the core mold 36 to be inserted into the positioning holes 35, 35 of the cavity mold 29. Next, the injection controller 9 is operated to discharge molten resin from the nozzle 25 in order to form primary products. Then, after passing a predetermined period of time from the beginning of applying the pressure to the duration of cooling the mold, the mold will be opened by switching the mold driving means according to the control signal from the electronic control device 14, so that the primary products formed between the cores 37 and the cavities 30 are taken off from the stationary mold while the formed products remain on the cores 37. Then, the moving cylinder 46 is operated by switching the electromagnetic directional control valve according to the signal from the electronic control device 14 to move the block A including the core mold 36 sliding along the passage with the dovetail groove engraved in the mold holder 7 in the direction horizontal (or vertical) to the mold holder 7, resulting in the core mold facing with the cavity mold 29 which is coupled with the injection unit 1. Here again, the mold is closed by operating the driving means for opening and closing the molds 8 according to the signal from the electronic control device 14. As was described above, by inserting the positioning pins 34, 34 into the positioning holes 35a, 35a of the cavity mold 29, the positioning can be accomplished between the cavities 31 and the cores 37 holding the first product, which results in unity of the core mold 36 and the cavity mold 29. The configurations of the cavities 31 are larger than those of the cavities 30 for the first products, so that the gaps for resin are still left within the cavities 31 even if the cores 37 holding the first products are fitted into the cavities 31. Then, by operating the injection controller 9 to inject from the nozzle 26 at the distal end of the injection cylinder 1 molten resin which has different color and different material than the first product has, the final products will be obtained within the cavities 31 in that the first product is made integral with different color or different materials.

Thereafter, when being cooled, the core mold 36 is opened, and by operating the ejector cylinder 45 the ejector plate 42 is moved to thrust down the products adhered to the cores 37 be means of the ejector pins 44, 44 protruded from the ejector plate 42. And the cavity mold 9 is opened to drop the runners 50, 51 altogether, as well as to return the block A back to the position opposite to the cavity mold on the side of the injection unit 2.

With regard to the injection molding machine according to the present invention, in order to prevent the occurrence of flash, it is desirable to have the end surface of the core mold 36 (moving mold), which is brought into contact with the cavity mold 29 (stationary mold), slightly protruding from the end surface of the mold holder 7 opposite the cavity mold 29. That is to say, the distance $H_A$ between the front surface of the moving platens 4 and the end surface of the core mold 36 is slightly larger than the distance $H_B$ between the front surface of the moving platen 4 and the mold holder 7. If both of their end surfaces are on the same plane, i.e., $H_A = H_B$, the sum of the area of both end surfaces turns out to be the contact area when they are clamped together, so that the pressure of the contact surfaces becomes smaller as to the certain clamping force, whereby flash occurs because of the gap between the contact surface of the cavity mold 29 and the core mold 36 under the influence of the pressure of resin in the cavity. On the other hand, in case of $H_A \geqq H_B$, the clamping force is applied only on the end surface of the core mold 36 to deliver the high pressure on the contact surfaces. However, the core mold 36 is dislocated from the center line of the clamping force, so that excess protrusion also causes the flash as the result of slanting by the operation of the deviation load. The result of experiments shows that no flash occurs when the core mold is protruded in a small range of $H_A - H_B < 0.05$ mm, since the high pressure on the contact surfaces is maintained, while the slanting is kept as small as possible.

Figure 5:
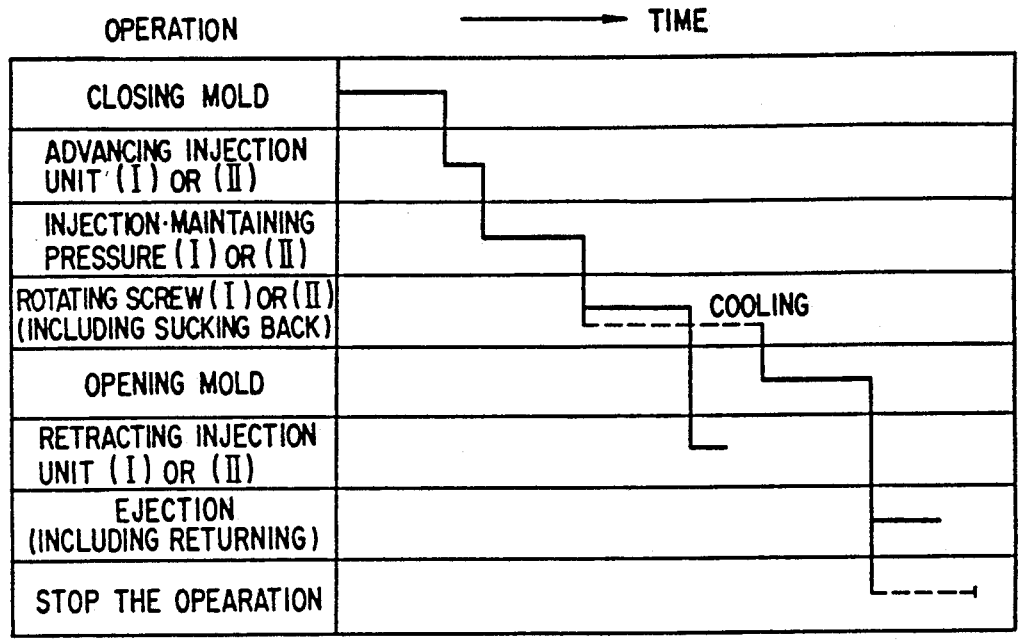
FIG. 5 is an operation control diagram in normal use of the injection molding machine of the present invention, one of the injection unit being waiting for changing colors or changing resin.

In case of the use of this injection molding machine for multiple-colored product, for example, only injection unit 1 or 2 can be used, while the injection unit 2 or 1 waits in line. An operation control diagram in this case is shown in FIG. 5. That is, the closing of the mold is carried out by operating the driving means 8 for opening and closing the molds in accordance with the control signal from the electronic control device 14. Then, by moving the injection unit 1 or 2 forwardly, the injection (maintaining pressure) is done for injection molding. Next, the mold is opened by switching the driving means 8 for opening and closing the molds in accordance with the control signal from the electronic control device 14. The injection unit is retracted thereafter, the ejector cylinder 45 is operated to push the product forward for completing one cycle.

Figure 6:
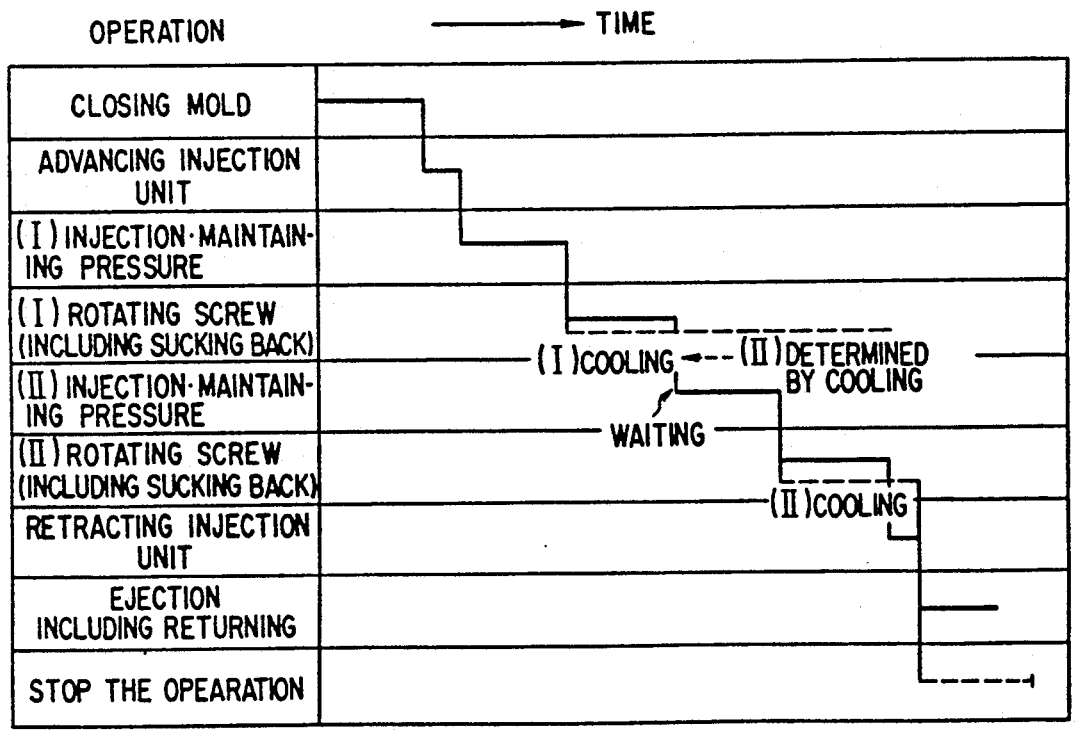
FIG. 6 an operation control diagram utilized when the injection molding machine of the present invention is used as a double-type molding machine incorporated with two sets of fixed molds and movable molds.

The injection molding machine of the present invention can be used as a dual-type molding machine by providing two sets of stationary and moving molds. As shown in an operation control diagram of FIG. 6, the mold is closed by operating the driving means 8 for opening and closing the molds in accordance with the control signal from the electronic control device 14.

Then, the injection unit 1 is moved forwardly for injection (maintaining pressure), completing the injection molding to the first mold. Next, the injection unit waiting in line will be processed for further injection (maintaining pressure), completing the injection molding to the second mold. Thereafter, the injection units 1 and 2 are retracted, the ejector cylinders 45 are operated to thrust out the products of the first and the second molds, thus completing one cycle.

In this mode, if the injection unit for thick products which require longer cooling period is used for injection first, then, while cooling this unit, the other side injection (maintaining pressure) is carried out. Because it eliminates the operation of the injection units at the same time, it makes the hydraulic pressure unit smaller, as well as enabling the prolonged effective cooling period. Thus, which injection unit is used first is selective by means of the signal from the electronic control device. And also, in many cases, small parts can be molded in two-colored molding within a few seconds of a cycle time, assuring the high productivity.

Moreover, the invention is not restricted to the above-mentioned embodiment, allowing a possibility of various variations with reference to the objects of the present invention.

INDUSTRIAL APPLICABILITY

According to the present invention, the following effects will be attained, enabling its wide industrial applicability.

(1) In a conventional two-colored or two-materials injection molding machine, when it is used for small quantity production of several items, the number of molds must be increased and expenses for them mounted up accordingly. However, in a general purpose injection molding machine of the present invention, it is aimed to prepare molds as compatible ones and to decrease the number of molds so that it can make the cost lower, as well as to simplify the structure of the molds which enables the simple and precise positioning. Besides, it can easily and promptly cope with products which has not clear outlook of lot production at an early development stage. Moreover, molds can be readily supplied, so that the developing period is minimized.

(2) When molding multi-colored products or with such materials as is difficult to clean because resin remains within a screw feeder, the machine can be used with one of the injection units being kept in waiting so as not to stop the entire machine, it is very convenient.

(3) As the respective injection operations are not done at the same time, it is possible to make the hydraulic pressure unit smaller, which contributes to save space.

(4) It can be used not only as two-colored or two-materials injection molding but also as a usual one color or one material injection molding machine, thus promoting multiple functions and improving adaptability.

We claim:

1. An injection molding machine comprising:
    a plurality of stationary molds securely disposed in a row on a stationary platen and transversely arranged parallel to one another;
    a moving mold which forms at least one mold cavity when coupled with each said stationary molds;
    a mold holder formed with a passage within which the moving mold is disposed and is linearly slidable in a direction parallel to the row of stationary molds, said mold holder being mounted on a moving platen;
    a plurality of injection units coupled, respectively, with said plurality of stationary molds;
    transfer means for conveying the moving mold along said passage to positions, respectively, opposite each of said plurality of stationary molds; and
    clamping means for moving said movable platen to apply pressure between said moving mold and a respective stationary mold;
    wherein said moving mold protrudes a short distance of not more than 0.05 mm toward said stationary mold from an end surface of said mold holder facing said stationary mold, said distance being selected such that slanting between said moving and stationary molds under pressure from within, due to off-center pressure of said clamping means, is minimized.

2. An injection molding machine according to claim 1, wherein a plurality of moving molds are disposed in said passage of said mold holder such that said plurality of moving molds and a respective plurality of stationary molds are clamped simultaneously.

3. An injection molding machine according to claim 2, wherein said short distance is 0.05 mm.

4. An injection molding machine according to claim 1, wherein said short distance is 0.05 mm.

* * * * *